United States Patent [19]

Robeson et al.

[11] Patent Number: 5,349,000

[45] Date of Patent: Sep. 20, 1994

[54] EXTRUDABLE POLYVINYL ALCOHOL COMPOSITIONS CONTAINING POLYESTER-POLYETHER BLOCK COPOLYMERS

[75] Inventors: Lloyd M. Robeson, Macungie, Pa.; Jeffrey A. Kuphal, Flemington, N.J.; Amir Famili, Orefield, Pa.

[73] Assignee: Air Products and Chemicals, Inc., Allentown, Pa.

[21] Appl. No.: 23,031

[22] Filed: Feb. 25, 1993

[51] Int. Cl.$^5$ .............................................. C08K 5/05
[52] U.S. Cl. .................... 524/388; 524/386; 524/503; 525/58
[58] Field of Search .................. 524/388, 503, 386; 525/58

[56] References Cited

U.S. PATENT DOCUMENTS

| | | | |
|---|---|---|---|
| 3,766,146 | 10/1973 | Witsiepe | 528/301 |
| 3,784,520 | 1/1974 | Hoeschele | 528/301 |
| 4,600,746 | 7/1986 | Schmukler et al. | 525/57 |
| 4,608,187 | 8/1986 | Chang | 252/90 |
| 4,611,019 | 9/1986 | Lutzmann et al. | 524/169 |
| 4,824,725 | 4/1989 | Thoese | 428/195 |
| 4,835,214 | 5/1989 | Shepherd et al. | 525/58 |
| 5,023,296 | 6/1991 | Moriyama et al. | 525/58 |
| 5,028,648 | 7/1991 | Famili et al. | 524/317 |
| 5,051,222 | 9/1991 | Martin et al. | 264/40 |

FOREIGN PATENT DOCUMENTS 0350224   1/1990   European Pat. Off. .
56-118439A   9/1981   Japan .
63-304043A   12/1988   Japan .
89308455A   12/1989   Japan .

OTHER PUBLICATIONS

Shuman et al., "Chemical Abstracts", vol. 63, pp. 5596g–5597h (1965).
Muchowski et al. "O–Functionalization of N–(t–butoxycarbonyl) aniline". JOC 45; 4798–01 (1980).
Fuhrer et al. "O–Functionalization of Aromatic Amines: O–Lithiation of N–Pivaloylanilines." JOC 44:113336 (1979).
Sheridan, Thomas W. "Copolymer Thermoplastic Elastomers" Chapter 6, pp. 181–223 Handbook of Thermoplastic Elastomers 2nd Edition Van Nostrand Reinhold Co.

Primary Examiner—Judy M. Reddick
Attorney, Agent, or Firm—Michael Leach; James C. Simmons; William F. Marsh

[57] ABSTRACT

In a melt extrudable polyvinyl alcohol composition consisting essentially of polyvinyl alcohol and plasticizer, which has been made melt extrudable by adding sufficient energy to the polyvinyl alcohol to both melt and substantially eliminate the crystallinity in the melt while simultaneously removing energy from the melt at a rate sufficient to avoid decomposition of the polyvinyl alcohol, the improvement which comprises 5 to 25 wt % poly(butylene terephthalate)-polytetrahydrofuran block copolymer for improved impact resistance.

19 Claims, No Drawings

EXTRUDABLE POLYVINYL ALCOHOL COMPOSITIONS CONTAINING POLYESTER-POLYETHER BLOCK COPOLYMERS

FIELD OF THE INVENTION

The present invention relates to melt extrudable polyvinyl alcohol compositions which have desirable physical properties.

BACKGROUND OF THE INVENTION

Thermoplastic polyvinyl alcohol (PVOH) is emerging as a new material to meet the demands of various safety/environmental related applications, as well as specialty water soluble applications. Specific applications include water soluble and biodegradable films and bottles for packaging pesticides, herbicides, detergents and the like. Additional applications include water soluble fibers for woven structures which can be safely disposed of in water, hospital bags for containing clothing for safe delivery to laundry sources without human contact, and water soluble containers for disposal of shipboard wastes which are biodegradable. Designed multilayered films for environmentally acceptable destruction comprising interlayers of PVOH and exterior layers of polyolefins offer properties for yard waste disposal in compostable applications.

U.S. Pat. No. 5,051,222 discloses a method for making thermoplastic (melt extrudable) PVOH compositions which comprises, providing sufficient energy to a PVOH which is at least partially crystalline to both melt the PVOH and substantially eliminate the crystallinity in the PVOH melt while simultaneously removing energy from the PVOH melt at a rate sufficient to avoid decomposition of the PVOH. The melt is then extruded, preferably into a strand, rapidly cooled and cut into pellets for subsequent thermoprocessing into the desired product or article.

Thermoplastic PVOH, generally, has excellent toughness at high relative humidity due to plasticization by adsorbed water. At low to intermediate relative humidity, thermoplastic PVOH compositions have limited toughness. At lower temperature, these compositions also exhibited lower toughness than desired. In order to alleviate this problem, one solution has been to modify thermoplastic PVOH compositions with the addition of more plasticizer. Plasticizer migration can yield additional problems related to the surface characteristics of extruded or injection molded objects. Thermoplastic polyurethane addition to thermoplastic PVOH yields impact modification to alleviate the toughness deficiency. (See U.S. Pat. No. 5,028,648). However, thermoplastic polyurethane addition yields crosslinking of the PVOH under conditions of high time or temperature exposure. An impact modifier which yields impact modification along with melt stability with thermoplastic PVOH is desired.

Polymer blends comprising PVOH are noted in many patents. The blends involve thermoplastic PVOH with polyolefins, polyamides, natural polymers, other water soluble polymers and in a few cases polyesters. The need to improve the impact strength of PVOH is noted in several of these references.

U.S. Pat. No. 4,611,019 discloses that the addition of small amounts (0.5 to 4.5 wt %) of selected polyamides or polyesters to plasticized melt extrudable PVOH homopolymer yields compositions with lower permeability to oxygen and other gases. The degree of hydrolysis for the PVOH is taught as greater than 95%. Plasticizers from 7 to 15 wt % are desired. These plasticizers include: aromatic sulfonamides, N,N-dimethylamides of fatty acids, polyols, alkylene carbonates, aromatic phosphates and phosphites, aromatic sulfonates and alkyl pyrrolidones. The polyesters noted are: poly(butylene terephthalate), poly(ethylene terephthalate) and polyether-polyester block copolymers.

U.S. Pat. No. 4,608,187 discloses that rubbery inclusions into cast PVOH films can be used to improve toughness. The rubbery inclusions noted, include polysiloxane, poly(ethylene oxide), neoprene, polyisoprene, natural rubber, styrene-butadiene copolymers, acrylates, poly(isobutylene) and poly(vinylidene chloride).

J56118439-A discloses the addition of a styrene-diene block copolymer to an ethylene-vinyl alcohol (EVOH) copolymer to improve impact strength.

U.S. Pat. No. 4,600,746 discloses blends of PVOH with a polyolefin or an ethylene-ester copolymer with groups capable of reacting with the hydroxyl of the PVOH for use as barrier polymers. Ethylene-acrylic acid copolymers, ethylene-methacrylic acid ionomers, and maleic anhydride grafted polyolefins are noted in blends with PVOH as melt processible alloys.

U.S. Pat. No. 4,824,725 discloses a blend of PVOH and a sulfonate containing polyester for use as a hydrophilic coating for a transparent base drafting film.

J01308455-A discloses a blend of an EVOH copolymer and a polyester amide or a polyether ester amide for use as a gas impermeable polymer.

EP350,224-A discloses a blend of poly(butylene terephthalate) and an EVOH copolymer has good gas barrier properties for food packaging applications.

J63304043 discloses a blend of a thermoplastic polyester [poly(ethylene terephthalate) or poly(butylene terephthalate)], an EVOH copolymer and a maleic anhydride modified styrene/olefin block copolymer.

"Handbook of Thermoplastic Elastomers," ed. by B. M. Walker and C. P. Rader, Chp. 6, p. 181, Van Nostrand Reinhold Co., New York, 1988, discusses polyester-polyether block copolymers as thermoplastic elastomers.

SUMMARY OF THE INVENTION

The present invention provides a PVOH composition containing a thermoplastic polyester-polyether block copolymer which composition is readily melt extrudable and provides extruded articles demonstrating good impact efficiency combined with melt stability. The extrudable PVOH/block copolymer composition consists essentially of:

(a) 75 to 95 wt % thermoplastic PVOH; and
(b) 5 to 25 wt % thermoplastic polyester-polyether block copolymer.

Also provided is a process for the production of such extrudable PVOH/block copolymer compositions in the form of essentially gel-free thermoplastic pellets, useful for conventional thermoplastic processing.

DETAILED DESCRIPTION OF THE INVENTION

Suitable PVOH's for use in the preparation of the extrudable PVOH/block copolymer composition and thermoplastic pellets include PVOH which is 75-99 mole % hydrolyzed, preferably 85-98 mole % hydrolyzed, and possesses a degree of polymerization (DPn)

in the range of 200 to 2,500, i.e., solution viscosities of 3 to 55 cps at 20° C. as a 4% aqueous solution. Copolymers of vinyl alcohol and methyl methacrylate consisting of 94–98 mole % vinyl alcohol and 2–6 wt % methyl methacrylate as disclosed in U.S. Pat. No.3,689,469 are considered suitable equivalents to the vinyl alcohol and vinyl acetate copolymer containing the same mole % acetate units. The PVOH may also contain up to 3–5 mole % of a copolymerized monomer.

The PVOH component of the PVOH/block copolymer composition, preferably comprises 80 to 92 wt %. Any plasticizers or other water soluble polymer additives in the thermoplastic PVOH are included in the wt % range for the PVOH.

The Encyclopedia of Polymer Science and Engineering, Second Ed., Vol.17, p. 167, John Wiley & Sons, New York 1989, notes several patents that disclose the preparation of extrudable PVOH utilizing high boiling, water-soluble organic compounds containing hydroxyl groups. These compounds, e.g., glycerin, low molecular weight poly(ethylene glycols), are plasticizers which lower the melting point of PVOH into a processable range. Other suitable plasticizers, such as sulfonamides can be considered if they are high boiling and miscible with PVOH. A thermoplastic PVOH is required for the present invention and the above noted plasticizers are incorporated to achieve thermoplastic behavior. Other water soluble polymers can also be added such as poly(vinyl pyrrolidone), poly(ethyl oxazoline), poly(ethylene oxide), hydroxypropylcellulose, starch and the like. Additional monomers can be incorporated into poly(vinyl acetate), such that the resultant hydrolyzed PVOH is either hot or cold (or both) water soluble. These monomers can include ethylene, propylene, other vinyl esters, acrylic acid, methacrylic acid, acrylates, methacrylates, vinyl pyrrolidone, N-vinylamide, N-vinylformamide and the like.

U.S. Pat. No.5,051,222 which is hereby incorporated by reference, teaches a method for making melt extrudable (thermoplastic) PVOH compositions suitable for use in the present invention. The method comprises providing sufficient energy to a PVOH which is at least partially crystalline to both melt the PVOH and substantially eliminate the crystallinity in the PVOH melt while simultaneously removing energy from the PVOH melt at a rate sufficient to avoid decomposition of the PVOH melt. The melt is then extruded, preferably into a strand, rapidly cooled and cut into pellets. Such thermoplastic pellets are marketed by Air Products and Chemicals, Inc. under the trademark VINEX.

One of the property limitations of thermoplastic PVOH, however, is that under modest humidity to dry conditions or at lower temperatures, these compositions tend to be brittle and have unacceptable impact resistance. It has been found that $(-AB-)_n$ block copolymers of poly(butylene terephthalate) and polytetrahydrofuran alleviate many of the problems of prior art approaches such as plasticizer migration or poor melt stability.

The polymerization of polyester-polyether block copolymers can be conducted using similar procedures as outlined for polyesters in "Principles of Polymerization", Second Ed., John Wiley & Sons, New York 1981, pp. 102–105, where hydroxy terminated polytetrahydrofuran block copolymers are employed. These polyester-polyether block copolymers are well known in the art and have been described in U.S. Pat. Nos. 3,784,520 and 3,766,146. The block copolymer is comprised of a multiplicity of recurring intralinear, long-chain and short-chain ester units connected head to tail through ester linkages with the long-chain ester units represented by the structure:

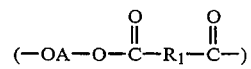

and the short-chain ester units being represented by the structure:

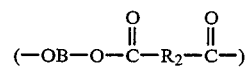

where A is divalent radical remaining after removal of the terminal hydroxy groups of a poly(tetrahydrofuran) glycol having a molecular weight (Mn) of from about 400 to about 4,000 and B is a divalent radical remaining after removal of hydroxyl groups from ethylene glycol, butanediol or cyclohexane dimethanol. $R_1$ and $R_2$ are preferably 1,4-phenylene radicals. Optionally $R_1$ and/or $R_2$ can be 1,3-phenylene, naphthalene or cyclohexylene radicals.

The most preferred polyester-polyether block copolymer is poly(butylene terephthalate)-polytetrahydrofuran. Poly(ethylene terephthalate)-polytetrahydrofuran, poly(ethylene isophthalate)-polytetrahydrofuran, poly(1,4-cyclohexylene terephthalate)-polytetrahydrofuran and poly(1,4-cyclohexylene isophthalate)-polytetrahydrofuran are also contemplated. These polyester-polyether block copolymers can be made by conventional ester interchange reactions as noted in "Principles of Polymerization" and in U.S. Pat. No. 3,784,520 and 3,766,146.

The weight of the polyester units constitutes 15 to 65 wt % of the block copolymer and the polytetrahydrofuran constitutes 35 to 85 wt %.

While the above procedure is preferred, other methods are contemplated for coupling blocks of polyester with polytetrahydrofuran blocks. An example would be to utilize an amine terminated polytetrahydrofuran of about 400 to 4000 Mn via amide linkages to the polyester blocks. Carboxylic acid terminated polytetrahydrofuran blocks could also be employed to yield the desired block copolymer. Amine terminated polytetrahydrofuran could be imidized with the structure:

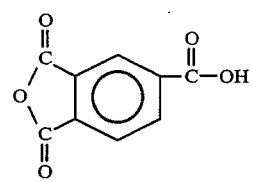

followed by incorporation into the polyester reaction to yield the desired copolymer.

The polyester-polyether block copolymer weight percent range is preferably from 8 to 20 wt %.

Other additives and polymers can be added to the thermoplastic PVOH/block copolymer composition, such as thermoplastic polyurethanes, thermoplastic starch, poly($\epsilon$-caprolactone), polyolefins, ethylene-methacrylic acid ionomers, fillers such as calcium carbonate, talc, clay, wollastonite, glass beads, carbon black, thermal and UV stabilizers, pigments, processing aids and the like.

The compositions of the present invention can be prepared by any conventional thermoplastic mixing method with extrusion preferred. Thus, the extrudable PVOH/block copolymer composition is obtained by mixing the thermoplastic PVOH with the block copolymer and melt extruding the mixture, preferably into pellets for subsequent thermoprocessing into the desired product or article.

Preferably, the PVOH/block copolymer compositions are prepared either (1) directly by melt blending a PVOH composition containing plasticizer with a block copolymer in a high intensity extruder similarly to U.S. Pat. No. 5,051,222 or (2) indirectly by first preparing melt extruded pellets of the plasticized PVOH composition in a suitable high intensity extruder according to U.S. Pat. No. 5,051,222, and then melt blending with the block copolymer, in both cases to make pellets of the PVOH/block copolymer composition which then may be converted to the desired extruded article by an appropriate extruder. Thus, the resultant composition can be used in various thermoplastic forming techniques, including extrusion, injection molding and compression molding for making injection molded articles, films, blow molded bottles, extruded profiles and the like.

EXAMPLES 1 AND 2

Blends of thermoplastic Vinex 2025 PVOH and Hytrel 4056 polyester-polyether block copolymer at ratios of 90:10 and 75:25 were prepared in a 2.54 cm Killion extruder (30/1 L/D) at 200° C. followed by pelletizing. The resultant blends along with a control sample of Vinex 2025 PVOH were injection molded at 200° C. using a Newbury 35.5 gm injection molding machine. The resultant samples were tested after several days in the laboratory (thus constant humidity conditioning was not employed). The results are listed in Table 1 along with pendulum impact strength data on compression molded samples shear cut from a 20 mil×10.2 cm×10.2 cm plaque.

The mechanical properties on the tensile specimens were determined using a procedure similar to ASTM-D638. The pendulum impact strength was determined using a procedure similar to that described in U.S. Pat. No. 4,665,122.

TABLE 1

|  | Tensile Modulus (psi/MPa) | Tensile Strength (psi/MPa) | % Elongation @ Break (%) | Pendulum Impact Strength (ft-lbs/in; J/m of notch) |
|---|---|---|---|---|
| Vinex 2025 | 295,000/2033 | 9600/66 | 184 | 10/534 |
| 90% Vinex 2025[a] 10% Hytrel 4056[b] | 251,000/1730 | 7200/50 | 354 | 90/4804 |
| 75% Vinex 2025 25% Hytrel 4056 | 179,000/1234 | 5400/37 | 320 | 14 to 35/ 747 to 1868 |

[a]Thermoplastic PVOH from Air Products and Chemicals, Inc. (88 mole % hyd; DPn = 500; 12 wt % plasticizer)
[b]Poly(butylene terephthalate)-polytetrahydrofuran block copolymer from duPont Physical properties of Hytrel 4056 copolymer are noted on p 183 of "Handbook of Thermoplastic Elastomers".

EXAMPLES 3 TO 11

Blends of thermoplastic Vinex 2025 PVOH with Hytrel 4056 and Lomod B0100 poly(butylene terephthalate)-polytetrahydrofuran (-AB-)$_n$ block copolymers and Estane 58277 and Pellethane 2355-85 thermoplastic polyurethanes were prepared according to the compositions noted in Table 2. The samples were prepared via extrusion in a 2.54 cm Killion extruder (30/1 L/D) at 200° C. The pelletized product was kept dry until testing. Melt flow data was obtained in a melt index apparatus to determine the melt flow following a procedure similar to that described in ASTM-D1238. The blends were injection molded using a 35.5 gm Newbury injection molding machine. The melt flow data measured at 210° C. and 44 psi (0.3 MPa) are tabulated in Table 2.

TABLE 2

| Example | Sample Description | $MF_{10}$ dg/min | $MF_{30}$ dg/min | $MF_{30}/MF_{10}$ |
|---|---|---|---|---|
| Control | Vinex 2025 | 7.54 | 7.30 | 0.97 |
| 3 | 90% Vinex 2025 10% Lomod B0100[a] | 6.10 | 5.74 | 0.94 |
| 4 | 85% Vinex 2025 15% Hytrel 4056 | 5.56 | 5.48 | 0.99 |
| 5 | 80% Vinex 2025 20% Hytrel 4056 | 5.94 | 5.86 | 0.99 |
| 6 | 80% Vinex 2025 20% Estane 58277[b] | 1.55 | 0.13 | 0.08 |
| 7 | 80% Vinex 2025 20% Pellethane 2355-85[c] | 2.34 | 0.59 | 0.25 |
| 8 | 80% Vinex 2025 10% Hytrel 4056 10% Estane 58277 | 2.94 | 1.23 | 0.42 |
| 9 | 63.75% Vinex 2025 21.25% EVAL-EP-F[d] 15% Hytrel 4056 | 4.66 | 4.49 | 0.96 |

[a]Poly(butylene terephthalate)-polytetrahydrofuran block copolymer from General Electric - Physical property data are available from General Electric product literature.
[b]Thermoplastic polyurethane from B. F. Goodrich
[c]Thermoplastic polyurethane from Dow Chemical Co.
[d]Ethylene-vinyl alcohol copolymer from EVAL Company of America.
$MF_{10}$ = melt flow after 10 minutes preheat at 210° C.
$MF_{30}$ = melt flow after 30 minutes preheat at 210° C.

The mechanical properties were determined on tensile specimens using a procedure similar to ASTM-D638 and are listed in Table 3 (samples were kept dry until testing). Example 9 involved an ethylene-vinyl alcohol copolymer/Vinex 2025 PVOH blend impact modified with a polyester-polyether block copolymer.

TABLE 3

| Example | Sample Description | Tensile Modulus* (psi/MPa) | Tensile Strength** (psi/MPa) | % Elongation** @ Break |
|---|---|---|---|---|
| Control | Vinex 2025 | 294,000/2027 | 14,500/100 | 26 |
| 3 | 90% Vinex 2025 10% Lomod B0100 | 260,000/1792 | 11,100/77 | 18–29 |
| 4 | 85% Vinex 2025 15% Hytrel 4056 | 251,000/1730 | 10,300/71 | 16 |
| 5 | 80% Vinex 2025 20% Hytrel 4056 | 240,000/1654 | 9,300/64 | 12 |
| 6 | 80% Vinex 2025 20% Estane 58277 | 235,000/1620 | 9,200/63 | 50 |
| 7 | 80% Vinex 2025 20% Pellethane 2355-85 | 225,000/1551 | 8,900/61 | 35 |
| 8 | 80% Vinex 2025 10% Hytrel 4056 20% Estane 58277 | 222,000/1530 | 9,300/64 | 48 |
| 9 | 63.75% Vinex 2025 | 249,000/1716 | 11,300/78 | 11 |

TABLE 3-continued

| Example | Sample Description | Tensile Modulus* (psi/MPa) | Tensile Strength** (psi/MPa) | % Elongation** @ Break |
|---|---|---|---|---|
| | 21.25% EVAL EP-F 15% Hytrel 4056 | | | |

*determined at 0.51 cm/min strain rate
**determined at 5.1 cm/min strain rate

Notched izod impact results were determined on Examples 3 to 9 as well as the control Vinex 2025 PVOH using a procedure similar to ASTM D-256. The samples were tested dry and after 72 hours conditioning at 50% relative humidity. These results are listed in Table 4.

TABLE 4

| Example | Sample Description | Izod Impact ft-lbs/in; J/m of notch (dry) Vent | Gate | Izod Impact ft-lbs/in; J/m of notch (50% relative humidity conditioning) Vent | Gate |
|---|---|---|---|---|---|
| Control | Vinex 2025 | 0.57/ 30.4 | 0.59/ 31.5 | 0.86/ 45.9 | 3.80/ 202.8 |
| 3 | 90% Vinex 2025 10% Lomod B0100 | 0.86/ 45.9 | 0.85/ 45.4 | 8.1/ 432.3 | 8.8/ 469.7 |
| 4 | 85% Vinex 2025 15% Hytrel 4056 | 0.95/ 50.7 | 0.95/ 50.7 | 8.4/ 448.4 | 12.2/ 651.2 |
| 5 | 80% Vinex 2025 20% Hytrel 4056 | 1.1/ 58.7 | 1.1/ 58.7 | 9.5/ 507.1 | 9.2/ 491.1 |
| 6 | 80% Vinex 2025 20% Estane 58277 | 0.87/ 46.4 | 0.94/ 50.2 | 27.6/ 1473.2 | 15.4/ 822.0 |
| 7 | 80% Vinex 2025 20% Pellethane 2355-85 | 1.7/ 90.7 | 1.2/ 64.1 | 5.0/ 266.9 | 29.3/ 1563.9 |
| 8 | 80% Vinex 2025 10% Hytrel 4056 10% Estane 58277 | 1.3/ 69.4 | 1.0/ 53.4 | 22.5/ 1201.0 | 25.2/ 1345.1 |
| 9 | 63.75% Vinex 2025 21.25% EVAL EP-F 15% Hytrel 4056 | 1.0/ 53.4 | 1.2/ 64.1 | 1.4/ 74.7 | 4.0/ 213.5 |
| 10 | 90% Vinex 2025 10% Hytrel 4056 | 0.87/ 46.4 | 1.0/ 53.4 | 13.5/ 720.6 | 14.4/ 768.6 |
| 11 | 75% Vinex 2025 25% Hytrel 4056 | 0.99/ 52.8 | 1.1/ 58.7 | 21.9/ 1168.9 | 23.8/ 1270.3 |

The results show a significant increase in the notched impact strength over the control thermoplastic PVOH. The melt flow stability as determined from the $MF_{30}/MF_{10}$ ratio (melt flow after 30 minutes preheat/melt flow after 10 minutes preheat) shows excellent melt stability for the thermoplastic PVOH containing the polyester-polyether block copolymers (Hytrel 4056 or Lomod B0100 copolymers) as compared to the thermoplastic polyurethanes which also exhibit excellent impact strength modification of thermoplastic PVOH but suffer from limited melt stability.

EXAMPLE 12

A blend of Airvol® 103 PVOH and Hytrel 4056 poly(butylene terephthalate)-polytetrahydrofuran $(AB-)_n$ block copolymer was produced on a Buss Kneader extruder under the following conditions:

| | |
|---|---|
| Machine: | Buss 46 mm kneader extruder with gear pump discharge |
| Composition: | 76.4% Airvol 103 PVOH with phosphoric acid to neutralize ash (1:1 mr) |
| | 13.5% Glycerine |
| | 0.75% Glycerol monooleate |
| | 9% Hytrel 4056 copolymer |
| Zone 1: | 240° C. |
| Zone 2: | 190° C. |
| Screw: | 190° C. |
| Gear Pump: | 192° C. |
| Die: | 197° C. |
| Melt Temp: | 202° C. |
| Screw Speed: | 300 RPM |
| Vacuum Level: | 710 mm Hg |
| KW: | 4.5 |
| Feed Rate: | 41 lbs/hr |

68 kg of Airvol 103 PVOH (98.9 mole % hyd; DPn=250) was charged into a Littleford 400 liter high intensity mixer. The mixer was started at 900 RPM and the temperature of the PVOH was raised to 45° C. Then 0.07 kg of glycerol monooleate was added to the mixer. When the temperature of the blend reached 62° C., 12 kg of glycerine mixed with 0.89 kg of phosphoric acid was slowly added to the blend. The mixing was continued at low speed until the blend reached 98° C. and then the material was discharged into a 1200 liter mixer/cooler. At this point 8.1 kg of Hytrel block copolymer pellets were added to the blender and thoroughly blended into the powder.

The powder was cooled to 26° C. and discharged. The blend was loaded into an Acrison volumetric feeder and fed into the feed port of the 46 mm Buss kneader extruder. The extrudate was smooth and clear. The material was blow molded into bottles. The bottles from the blend exhibited improved toughness over control samples.

STATEMENT OF INDUSTRIAL APPLICATION

The present invention provides a melt extrudable PVOH/polyester-polyether block copolymer composition for making injection molded articles, films, blow molded bottles and extruded profiles.

We claim:

1. In a melt extrudable polyvinyl alcohol composition comprising polyvinyl alcohol and plasticizer, the improvement for providing good impact efficiency which comprises 8 to 25 wt % thermoplastic polyester-polyether block copolymer, based on total composition.

2. The melt extrudable polyvinyl alcohol composition of claim 1 in which the polyvinyl alcohol is 75–99 mole % hydrolyzed and has a degree of polymerization of 200–2500.

3. The melt extrudable composition of claim 1 which comprises 8–20 wt % block copolymer.

4. The melt extrudable composition of claim 1 in which the block copolymer is 15–65 wt % polyester and 35–85 wt % polyether.

5. The melt extrudable composition of claim 1 in which the block copolymer is comprised of a multiplicity of recurring intralinear, long-chain and short-chain ester units connected head to tail through ester linkages with the long-chain ester units being represented by the structure:

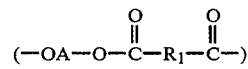

and the short-chain ester units being represented by the structure:

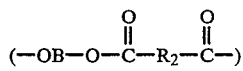

where A is a divalent radical remaining after removal of the terminal hydroxy groups of a poly(tetrahydrofuran) glycol having a molecular weight (Mn) of from about 400 to about 4,000; B is a divalent radical remaining after removal of hydroxyl groups from ethylene glycol, butanediol or cyclohexane dimethanol; and $R_1$ and $R_2$ are independently 1,4-phenylene, 1,3-phenylene, naphthalene or cyclohexylene radicals.

6. The melt extrudable composition of claim 5 in which the block copolymer is poly(butylene terephthalate)-polytetrahydrofuran, poly(ethylene terephthalate)-polytetrahydrofuran, poly(ethylene isophthalate)-polytetrahydrofuran, poly(1,4-cyclohexylene terephthalate)-polytetrahydrofuran, or poly(1,4-cyclohexylene isophthalate)-polytetrahydrofuran.

7. In a melt extrudable polyvinyl alcohol composition comprising polyvinyl alcohol which is 75-99 mole % hydrolyzed and has a degree of polymerization from 200-2500 and plasticizer, the improvement for providing good impact efficiency which comprises 8to 25 to wt % thermoplastic polyester-polyether block copolymer, based on total composition, which is comprised of a multiplicity of recurring intralinear, long-chain and short-chain ester units connected head to tail through ester linkages with the long-chain ester units being represented by the structure:

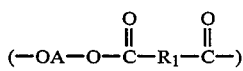

and the short-chain ester units being represented by the structure:

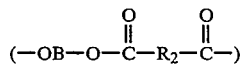

where A is a divalent radical remaining after removal of the terminal hydroxy groups of a poly(tetrahydrofuran) glycol having a molecular weight (Mn) of from about 400 to about 4,000; B is a divalent radical remaining after removal of hydroxyl groups from ethylene glycol, butanediol or cyclohexane dimethanol; and $R_1$ and $R_2$ are independently 1,4-phenylene, 1,3-phenylene, naphthalene or cyclohexylene radicals.

8. The melt extrudable composition of claim 7 in which B is a divalent radical remaining after removal of hydroxyl groups from butanediol.

9. The melt extrudable composition of claim 7 in which $R_1$ and $R_2$ are 1,4-phenylene radicals.

10. The melt extrudable composition of claim 7 in which the block copolymer is poly(butylene terephthalate)-polytetrahydrofuran block copolymer.

11. The melt extrudable composition of claim 7 in which the polyvinyl alcohol is 85-98 mole % hydrolyzed.

12. The melt extrudable composition of claim 7 which comprises 8-20 wt % block copolymer.

13. In a melt extrudable polyvinyl alcohol composition comprising polyvinyl alcohol which is 85-98 mole % hydrolyzed and has a degree of polymerization from 200-2500 and plasticizer, the improvement for providing good impact efficiency which comprises 8 to 25 wt % thermoplastic poly(butylene terephthalate)-polytetrahydrofuran block copolymer, based on total composition.

14. The melt extrudable composition of claim 13 in which the block copolymer is 15-65 wt % polyester and 35-85 wt % polyether.

15. The melt extrudable composition of claim 14 which comprises 8-20 wt % block copolymer.

16. The melt extrudable composition of claim 15 in which the plasticizer is glycerine.

17. An article made by melt extruding the composition of claim 1.

18. An article made by melt extruding the composition of claim 7.

19. An article made by melt extruding the composition of claim 13.

* * * * *